(12) United States Patent
Brombach

(10) Patent No.: US 12,021,477 B2
(45) Date of Patent: Jun. 25, 2024

(54) METHOD FOR CONTROLLING A WIND TURBINE

(71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 9 days.

(21) Appl. No.: 17/617,863

(22) PCT Filed: Jun. 5, 2020

(86) PCT No.: PCT/EP2020/065729
§ 371 (c)(1),
(2) Date: Dec. 9, 2021

(87) PCT Pub. No.: WO2020/249489
PCT Pub. Date: Dec. 17, 2020

(65) Prior Publication Data
US 2022/0247333 A1 Aug. 4, 2022

(30) Foreign Application Priority Data
Jun. 12, 2019 (DE) ..................... 10 2019 115 943.1

(51) Int. Cl.
*H02P 9/10* (2006.01)
*F03D 7/02* (2006.01)
(Continued)

(52) U.S. Cl.
CPC ............ *H02P 9/107* (2013.01); *F03D 7/0272* (2013.01); *F03D 7/0284* (2013.01); *F03D 13/20* (2016.05);
(Continued)

(58) Field of Classification Search
CPC .. H02P 9/107; H02P 2101/15; H02P 2103/20; F03D 13/20; F03D 7/0272;
(Continued)

(56) References Cited

U.S. PATENT DOCUMENTS

2009/0230681 A1* 9/2009 Scholte-Wassink .... F03D 7/045
290/44
2012/0104756 A1* 5/2012 Beekmann ............ F03D 7/0284
290/44
(Continued)

FOREIGN PATENT DOCUMENTS

DE 10 2009 059 669 A1 6/2011
DE 10 2011 100 981 A1 11/2012
(Continued)

OTHER PUBLICATIONS

Heier, "Wind turbines: System design, integration and regulation," Edition 3, 5.5 Controller design, pp. 431-434 and 456-463, 2003. (German text with English machine translation; 43 pages).

*Primary Examiner* — Viet P Nguyen
(74) *Attorney, Agent, or Firm* — Seed IP Law Group LLP

(57) ABSTRACT

Provided is a method for controlling a wind turbine for feeding electrical power into an electrical supply grid. The turbine comprises a tower, a nacelle, an aerodynamic rotor, a generator coupled to the aerodynamic rotor and intended for generating power from wind, a power unit for controlling the generator for controlling power output by the generator and/or for controlling a generator torque and a feed-in unit for feeding the power output by the generator or part thereof into the electrical supply grid. The method comprises controlling the turbine such that, in normal operation, a feed-in power is fed into the electrical supply grid in dependence on the wind and changing the feed-in power in dependence on a grid state and/or a grid demand of the electrical supply grid (Continued)

such that a specifiable mechanical, in particular momentary, loading limit of the turbine is maintained.

19 Claims, 3 Drawing Sheets

(51) Int. Cl.
    *F03D 13/20*      (2016.01)
    *H02P 101/15*      (2016.01)
    *H02P 103/20*      (2016.01)

(52) U.S. Cl.
    CPC . *F05B 2220/706* (2013.01); *F05B 2270/1033* (2013.01); *F05B 2270/337* (2013.01); *H02P 2101/15* (2015.01); *H02P 2103/20* (2015.01)

(58) Field of Classification Search
    CPC .............. F03D 7/0284; F05B 2220/706; F05B 2270/1033; F05B 2270/337
    See application file for complete search history.

(56) References Cited

U.S. PATENT DOCUMENTS

| | | |
|---|---|---|
| 2013/0015658 A1 | 1/2013 | Vath et al. |
| 2017/0009740 A1* | 1/2017 | Geisler ................... F03D 9/257 |
| 2017/0328342 A1* | 11/2017 | Kjær ......................... F03D 9/25 |
| 2020/0052628 A1 | 2/2020 | Busker et al. |
| 2020/0136540 A1 | 4/2020 | Brombach |

FOREIGN PATENT DOCUMENTS

| | | | |
|---|---|---|---|
| DE | 10 2016 120 700 A1 | 5/2018 |
| DE | 10 2017 112 936 A1 | 12/2018 |
| EP | 354 541 A1 | 8/2011 |

* cited by examiner

METHOD FOR CONTROLLING A WIND TURBINE

BACKGROUND

Technical Field

The present invention relates to a method for controlling a wind turbine. The present invention also relates to a wind turbine. The present invention additionally relates to a wind farm with multiple wind turbines.

Description of the Related Art

Wind turbines are known, they generate electrical power from wind and feed it into an electrical supply grid. As a result, wind turbines can make a contribution to the energy supply, but they are increasingly also used for tasks of supporting the electrical supply grid. It should be particularly noted here that, of all the feeding generators, wind turbines are among those that can be controlled the quickest. Consequently, they can be used particularly for quick short-term changes of the power feed-in.

These good properties of wind turbines have increasingly been recognized and are increasingly also being used for grid support. Apart from the suitability of wind turbines for quick control, wind turbines can also perform supporting tasks, particularly a quick increase in power or reduction in power, but not to any desired level and/or not in any desired short time. It should be particularly noted that wind turbines always, that is to say if they are not assigned a corresponding store, can only feed into the electrical supply grid as much power as is possible on the basis of the prevailing wind and of course the design of the wind turbine.

For this reason, it is known to operate wind turbines at a deliberately cut-back level, in order to be able when required to increase their power feed-in by the cut-back power value.

Apart from the fact that such a method has the effect that energy that can be generated from the wind is forfeited, such a method also does not however take into account that the power to be fed in from the wind turbine cannot be changed without putting a load on the wind turbine. Particularly quick power changes may constitute putting a load on the wind turbine that is unfavorable and can for example have unfavorable effects on the lifetime of the wind turbine. In other words, such loading can lead to a shortening of the lifetime of the wind turbine. Although there are proposals, accordingly such a reduction of the service life can be estimated, they do not prevent such a reduction of the service life.

The German Patent and Trademark Office has searched the following prior art in the priority application relating to the present application: DE 10 2017 112 936 A1, US 2017/0 328 342 A1, EP 2 354 541 A1, HEIER, Siegfried: Windkraftanlagen: Systemauslegung, Integration and Regelung [Wind turbines: system design, integration and control], 3rd revised and extended edition, Wiesbaden: Vieweg+Teubner, 2003, pp. 431-434 & 456-462. —ISBN 978-3-663-07668-1, DE 10 2009 059 669 A1, DE 10 2011 100 981 A1, US 2009/0 230 681 A1 and DE 10 2016 120 700 A1.

BRIEF SUMMARY

One or more embodiments are directed to limiting or reducing a loading of the wind turbine arising due to demands for grid support.

A method for operating a wind turbine is provided. A method for controlling a wind turbine is proposed. Assumed here is a wind turbine which is intended for feeding electrical power into an electrical supply grid and has a tower with a nacelle arranged rotatably on it. The wind turbine additionally has an aerodynamic rotor, which can be driven by wind, and a generator, which is coupled to the aerodynamic rotor and is intended for generating electrical power from wind. Also provided for this purpose is a power unit for controlling the generator for controlling electrical power output by the generator.

The generator is driven, directly or indirectly, by the aerodynamic rotor, in order thereby to generate electrical power from wind. Also provided is a power unit, for controlling the generator for controlling electrical power output by the generator. Consequently, the electrical power output by the generator can be controlled by way of the power unit. For this purpose, an active rectifier, which consequently rectifies the stator current of the generator, may particularly be provided. The control of the stator current consequently also allows the wind turbine to be controlled. At least, as a result an output power of the wind turbine can be controlled.

Furthermore, a feed-in unit for feeding the electrical power output by the generator or part thereof into the electrical supply grid is also provided.

The present disclosure is consequently based on these elements of a wind turbine. Building on this, the method comprises the following steps.

The wind turbine is controlled such that, in normal operation, an electrical feed-in power is fed into the electrical supply grid in dependence on the wind. Normal operation is to this extent operation in which no grid supporting demands are made. Consequently, the wind turbine feeds in in so-called grid-parallel operation, in which it therefore feeds in as much power as is possible on the basis of the prevailing wind and of course the design of the wind turbine.

It is also proposed that the electrical feed-in power is changed in dependence on a grid state or a grid demand of the electrical supply grid. For example, it may be provided that the feed-in power is reduced with increasing grid frequency, in any event as soon as the grid frequency has exceeded a predetermined limit value. In this case, the electrical feed-in power is changed in dependence on a grid state. If this frequency-dependent power reduction is a stipulation of the electrical supply grid, the electrical feed-in power is consequently also changed in dependence on an at least indirect grid demand.

However, it also comes into consideration that a current and specific grid demand must be met, accordingly for example the electrical supply grid or its operator expressly requires the reduction of the fed-in power by a percentage.

In this respect it is thus also proposed that the changing of the electrical feed-in power is guided such that a specifiable mechanical, in particular momentary, loading limit of the wind turbine is maintained. The wind turbine therefore does not directly implement a required change in the power fed in, whether it is dependent on a grid state or dependent on a specific demand for changing the power, but guides the changing of the electrical feed-in power. The changing of the electrical feed-in power is in this case guided such that the specifiable mechanical loading limit of the wind turbine is maintained. Such a mechanical loading limit may also be or comprise a set of multiple individual loading limits.

This is based particularly on the idea that for example an abrupt increase in the power fed in is only possible by an abrupt increase in the torque. It does not matter too much here whether the torque has actually been increased directly, or the power output by or taken from the generator increases abruptly, which has an abrupt increase in the torque as a consequence.

In any event, the limiting of the specifiable mechanical power may particularly take place by a respective power demand not being passed on unchecked or unfiltered to the wind turbine, in particular to the generator, for implementation. Particularly in the case of a desired jump in power, which is therefore desired by the electrical supply grid, this is passed on in a somewhat lessened form to the generator for implementation. For example, the use of a limitation to a flank for changing the power comes into consideration, or such a power demand can be passed via a dynamic filter. In a simple case, such a dynamic filter may be a filter with simple lowpass characteristics, such as for example a delay element of the first order or second order.

As a result, a jump in power, and an accompanying loading of the wind turbine, can be avoided by a simple checking of the filtering of the specified value for the changing of the power.

It should be noted that unhindered passing on of an abrupt change in power, to keep to this example, may lead to an abrupt change in the generator torque, and that leads directly to mechanical loading of the generator. Such mechanical loading of the generator then possibly likewise affects the rotor blades of the rotor of the wind turbine. Such a jump in torque may also have an effect on the mounting of the generator on a machine carrier of the wind turbine.

Other changes in power than the jump in power mentioned by way of example also come into consideration however for such undesired loading, such as for example changes in the power that are not abrupt but nevertheless very quick.

Which changes in torque and/or power lead to which mechanical loadings, or to which level of mechanical loading, can be recorded in advance in simulations. However, on-site measurements in which such quick changes in power and/or changes in torque are carried out also come into consideration. The resultant loading may for example be recorded by strain gages on the rotor blades or by strain gages on other loaded elements, such as for example the rotor hub. It is preferably ensured that only a few such measurements are carried out, and consequently few required instances of inducing corresponding loading. Alternatively, such measurement may be carried out with very low loading values and then be projected by calculation, in particular extrapolated, to correspondingly high loading.

It should be emphasized that the proposal concentrates on changing the electrical feed-in power. It is therefore checked to what extent the changing of the electrical feed-in power leads to mechanical loading, and correspondingly the changing of the electrical feed-in power is then carried out such that the specifiable mechanical loading limit is maintained, in particular carried out with such gradual changes over time. The specifiable mechanical loading limit may also be referred to as the specified mechanical loading limit.

According to one embodiment, it is proposed that at least one limit gradient is specified for changing the feed-in power. Such a limit gradient is a maximum, in terms of amount, change over time of a power value, particularly a power value of an electrical power generated by the generator. The limit gradient may also be a maximum, in terms of amount, change of a generator torque to be controlled. In a graphically illustrative form, such a limit gradient consequently forms a flank rising with time, which must not be overshot by the corresponding power or the corresponding generator torque, and a falling flank, which must not be undershot by the corresponding power or the generator torque to be controlled. It is consequently proposed not to specify the corresponding power or the corresponding generator torque with regard to its variation, but to limit it with regard to its variation.

If therefore the changing of the electrical feed-in power in dependence on the grid state or in dependence on the grid demand leads to a changing of the power or to a changing of the generator torque which does not overshoot the limit gradient, in terms of amount, no change occurs. If, however, the changing of the electrical feed-in power would require a greater change, in terms of amount, the limit gradient would be reached and as a result the changing would be limited. This ultimately achieves the effect that changes that are too great or too quick are not passed on to the generator, and consequently changes that are too great or quick are not implemented. A mechanical loading limit of the wind turbine is thereby maintained.

The already mentioned investigations in advance, which may determine a link between changes in power and resultant loadings, consequently allow the mechanical loading to be specified and a corresponding limit gradient to be chosen on the basis of the recorded link.

Preferably, the limit gradients are variable. Particularly, they may be specified situation-dependently. For example, a wind turbine in part-load operation, when the wind is therefore so weak that the wind turbine cannot reach its rated power, may possibly only be mechanically loaded by a changing of the feed-in power to a lesser extent than a wind turbine that is feeding in in full-load operation, which is therefore operated with correspondingly stronger wind.

Preferably, the limit gradient may also be varied for one and the same operation, in that a strong increase is allowed at the beginning, but is for example already reduced a few seconds later, that is to say for example 3, 4 or 5 seconds later. This is based on the idea that an initially short quick increase in power leads to mechanical loading that is still allowable, whereas the additional mechanical loading would however be exceeded if a correspondingly great change of the feed-in power were continued to be allowed.

It also comes into consideration that mechanical loading only occurs due to an oscillation. Also such an oscillation can be prevented by specifying a corresponding limit gradient. To this extent it should be noted that a limitation of the change in power or a change in generator torque is a non-linear function. The effect consequently depends on the amplitude. According to the limited amplitude, this can possibly cause oscillations, and conversely such oscillations can be prevented by correspondingly specifying the limit gradient. It also comes into consideration here to check by investigations in advance such as simulations by which limit gradients such oscillations or other oscillations can be prevented or limited.

According to one embodiment, it is proposed that a generator torque of the generator is controlled by way of a setpoint torque value, the setpoint torque value being passed via a filter element, for reducing oscillation and/or for avoiding excitement of generator oscillation, the filter element being configured in particular as a lowpass filter and/or as a delay element, in particular as a linear delay element of the first or second order.

To this extent, a special pre-filtering for the controlling of the generator is proposed. Such a filter element may also be referred to as pre-control. The filter element prevents that a jump in the setpoint value of the setpoint torque value is implemented directly in the generator control. As a result, particularly a surge in the generator, which could excite an oscillation in the generator, can also be avoided. The filter element avoids such a surge, and consequently avoids such an excitement of an oscillation or can also serve for reducing oscillation.

The use of a lowpass filter consequently has the effect that particularly higher frequencies are removed from the setpoint torque value. Particularly the use of a linear lowpass filter, such as a linear delay element of the first or second order, makes a dynamic consideration possible, in particular also consideration in the frequency domain. As a result, eigenvalues or a resonant frequency of the generator can be specifically taken into account.

The use of the limit gradient and a filter element, which may also be referred to synonymously as a filter, can also be combined. In particular, such a combination may take the form that first a limitation of the power and/or of the generator torque is performed by the limit gradient and then the signal thus limited is processed further. The signal thus limited may already represent a limitation of a setpoint torque value and then be passed as such via the filter element. Or, particularly if it concerns an amount of power, the limited signal may be transformed into a setpoint torque value and the resultant setpoint torque value may be passed via the filter element.

According to one embodiment, it is proposed that the changing of the electrical feed-in power is controlled such that, following a generator torque exceeding a torque limit value predetermined in terms of amount, a further generator torque exceeding the predetermined torque limit value is suppressed for a predetermined recovery time period or is limited to the torque limit value. Consequently, initially an excessive generator torque is allowed. If a further generator torque exceeding the torque limit value then occurs, this is no longer allowed. Depending on the situation, this may mean that it is generally not allowed, but is preferably limited to the torque limit value. This preferably takes place for 5 to 30 seconds. Preferably, the generator torque exceeding the predetermined torque limit value is also allowed for a predetermined time period and this time period may correspond to the recovery time period.

It has however been recognized that the underlying problem may be that the generator and the mechanical structure behind it may start oscillating due to a number of great generator torques in series. This fundamentally obviates the problem that the generator torque is permanently too great. It should also be noted here that such a high generator torque, which may also be referred to synonymously as a generator moment, occurs particularly due to a change in power.

Such a high generator torque may occur particularly if, as a result, flywheel energy, that is to say kinetic energy, is to be removed from the rotor of the wind turbine. If a great generator torque thereby occurs, this means that the generator is also strongly braked. If this great generator torque were therefore to occur for a long time, for example for one minute, this may lead to such strong braking of the generator, and consequently the rotor, of the wind turbine that it may come to a standstill. Such a situation is also unfavorable and usually undesired; however, there is then no longer high mechanical loading.

Provided herein is reducing or limiting a mechanical loading and, to remain with the example mentioned, this may occur particularly as a result of kinetic energy being removed from the rotor of the wind turbine in the short term and for a short time, for example for 5 seconds, by a correspondingly high generator torque. This may be the case for example when the frequency in the electrical supply grid fluctuates and the wind turbine tries to counteract it by briefly increased power feed-in.

If therefore the generator torque has been very high for a brief moment, such as the 5 seconds mentioned by way of example, it can be assumed that no additional energy is demanded in the following 5 seconds, on account of the frequency oscillation in the electrical supply grid, and the generator torque has correspondingly dropped again. Likewise 5 seconds later, to keep with the above example, a high power demand may then occur once again, with a corresponding resultant high generator torque. Therefore, great changes of torque potentially occur in the 5 second cycle. Depending on the frequency of these great changes of torque, they may lead to the generator or the generator rotor system starting to oscillate. To avoid this, the mentioned recovery time period is provided. As a result, a rapid succession of great generator torques is avoided.

According to a further embodiment, it is proposed that the changing of the electrical feed-in power is controlled such that, in the case of a decaying oscillation of the generator torque with a maximum amplitude that exceeds the predetermined amplitude limit value, a further generator torque pulse with at least half the amplitude of the amplitude limit value is avoided. If, therefore, the generator torque oscillates, which can be accompanied by a mechanical oscillation of the generator and the rotor, any further generator torque pulses are suppressed. If these generator torque pulses are small, to be specific less than half the amplitude of the amplitude limit value, it is possible to dispense with this suppression.

It can as a result be prevented that such decaying, but still existing oscillation of the generator torque is indeed excited again. It is proposed in this respect that this suppression of such further generator torque pulses is carried out until the decaying oscillation has decayed to an amplitude that lies below a predetermined amplitude decay value. This amplitude decay value is preferably chosen to be less than 25% of the amplitude limit value.

There is therefore at most still an oscillation with an amplitude of a quarter of the amplitude limit value and, in the case of such a small value of a quarter, it can be assumed that the oscillation is considered to have essentially decayed.

Alternatively, a decay time may also be chosen, so that therefore the suppression of further generator torque pulses of a corresponding level is only carried out until a predetermined decay time has elapsed. Such a decay time preferably lies in the range from 5 to 30 seconds. It has been recognized here that—depending on the generator—a generator oscillation has decayed, which even in the case of generators of low oscillating frequency can be assumed at 30 seconds. Of course, depending on the generator, a different decay time may also be chosen.

According to one embodiment, it is proposed that a generator control circuit, which comprises at least the generator and the power unit, is formed for controlling the generator. It is also proposed that control dynamics, in particular eigenvalues and/or poles, are specified for the generator control circuit, and the specifying of the control dynamics, in particular the eigenvalues or poles, takes place such that the specifiable mechanical loading limit of the wind turbine can be maintained.

When using a generator control circuit of such a configuration, the torque can consequently be specified as a setpoint value and to this extent form the input variable for the control circuit. The current actual value of the torque value is subtracted from this and the resultant system deviation is passed via a controller, the dynamics of which can be specified, or by way of which the dynamics of the control circuit can be specified.

The result of such a controller may then be a manipulated variable. The manipulated variable may be passed to the power unit for implementation. The manipulated variable may be for example an exciter current to be set if the generator is designed as a separately excited synchronous generator. By way of this exciter current, the generator torque can be set, or at least fundamentally changed.

This is however only one, particularly graphic example. According to another example, the setting of the generator torque may take place by way of an active rectifier. The active rectifier may for this purpose control the stator current output by the generator, and thereby the power output by the generator. As a result, in turn the generator torque can be set.

With the generator control circuit, a power of the generator, to be specific an output power, can be set directly. In this case, there is therefore a setpoint value for the output power that is to be set. This can be compared with an actual value of the output power, that is to say the generator power, and the resultant system deviation can be passed via the controller, which calculates a manipulated variable from it and passes it to the power unit for implementation.

It has consequently been recognized that such dynamics that can also influence mechanical loading, and as a result can prevent mechanical overloading, can be specified by way of this generator control circuit. Particularly, the parameterization of this generator control circuit can be used to make the control of the generator so slow that generator torques that are too high, and consequently mechanical loadings that are too high, are avoided.

The use of such a generator control circuit can also be combined with the proposal of the limit gradient and/or the proposal of the upstream filter element. The parameterization of the generator control circuit may possibly have to be adapted to it.

According to one embodiment, it is proposed that the generator control circuit includes mechanical elements or takes into account mechanical properties, to be specific the aerodynamic rotor, in particular its moment of inertia, and/or at least one blade eigenfrequency and additionally or alternatively the tower with the nacelle, in particular at least one eigenfrequency of an oscillation of the tower with the nacelle.

It is consequently proposed that these dynamics that are caused by the mechanical properties are taken into account in the generator control circuit. This is particularly reflected in the parameterization of the control circuit. It is particularly known that not only the aerodynamic rotor and the rotor blades but also the interrelationship between the tower and then nacelle can in each case have an eigenfrequency and/or corresponding complex conjugate eigenvalues. Such properties may be known or determined in simulations. These properties can then be introduced into the generator control circuit, particularly into the parameterization of the generator control circuit.

According to one embodiment, it is proposed that the generator control circuit includes a property or a behavior of the electrical supply grid, in particular that an eigenfrequency and/or an oscillation of the electrical supply grid is included. A property, in particular an eigenfrequency, of the electrical supply grid is consequently a general property that may, but does not have to, lead to an oscillation. If it leads to an oscillation, the associated frequency is in that case known. This frequency is also of importance for the question of its excitation, and it is proposed precisely for this purpose that it is taken into account in the generator control circuit.

Additionally or alternatively, a current behavior, in particular a currently existing oscillation, of the electrical supply grid may be recognized and then can be taken into account directly in the control circuit. In this case, the control circuit could be adaptively designed, in order to take into account such current behavior, in particular a current frequency of an oscillation. Alternatively, the control circuit may be designed so robustly that it can cover a spectrum of possible frequencies. Such a spectrum may be the result of empirical values.

According to one embodiment, it is proposed that a mechanical model of the wind turbine is taken into account in the changing of the electrical feed-in, in order to guide the changing of the electrical feed-in such that a specifiable, in particular momentary, mechanical loading limit of the wind turbine can be maintained. It is proposed with particular preference that the mechanical model is contained in the generator control circuit, or at least is taken into account there.

Such a mechanical model modulates particular relationships between mechanical movements, mechanical bending distortions and mechanical forces, therefore maps them. This preferably includes the modulation of a relationship between the generator torque occurring, which consequently also acts on the rotor, and the resultant movement of the rotor and also other forces occurring on the rotor. It may thus include an acceleration behavior of the rotor dependent on such a torque, including a resultant bending distortion of the rotor blades, the forces resulting from that on the rotor blades and in particular on the pitch bearing at which the rotor blades are fastened to the hub of the rotor, and possible oscillations occurring.

If it is therefore planned for example to increase the electrical feed-in power, it can be deduced how in return the generator torque increases. This generator torque, or its likely increase, may then form an input variable for the mechanical model and, depending on this, it can be recognized which mechanical loads are to be expected. This can then be compared with the specifiable mechanical loading limit and, depending on this, the changing of the electrical feed-in power can be adapted as required, that is to say in particular reduced or slowed down as required.

These aspects can be taken into account by the mechanical model being contained in the generator control circuit. For example, a mechanical loading that is recognized by the mechanical model can change a control gain in the generator control circuit by way of a control stipulation. For this, the mechanical model may be directly incorporated in the generator control circuit. It may however also be that the mechanical model is taken into account in the generator control circuit by the input variable of the generator control circuit, that is to say the setpoint value for the generator torque or the setpoint value for the generator power to be set, being adapted dependent on the mechanical model.

According to one embodiment, it is proposed that an oscillation detector is provided, for detecting at least one oscillation of the wind turbine, in particular for detecting mechanical oscillations and/or oscillations of the generator, the at least one detected oscillation being used for guiding the changing of the electrical feed-in power such that the specifiable mechanical loading limit of the wind turbine can be maintained.

It is consequently proposed here as a variant that mechanical oscillations and/or oscillations of the generator are directly detected. Mechanical oscillations of the wind turbine and/or oscillations of the generator are at the forefront here. Mechanical oscillations of the wind turbine may particularly also be oscillations of the rotor, particularly in the direction of rotation. Such oscillations may be caused for example by elasticities of the rotor blades. However, oscillations in the longitudinal direction of a rotor axis of rotation, and consequently generator axis of rotation, also come into consideration. Such oscillations can also be caused by changes in power, and consequently changes in load.

It is likewise proposed to detect oscillations of the generator. Such generator oscillations may also be mechanical oscillations. However, it also comes into consideration that a torque oscillation is detected, and this can be detected electrically. However, such a torque oscillation then also often causes a mechanical oscillation. It is particularly proposed here to use the method for a gearless wind turbine. In this case, oscillations of the generator also act directly, to be specific without an intermediate gear mechanism, on the rotor, and similarly oscillations of the rotor act directly on the generator.

Such an oscillation detector may be for example an acceleration sensor, which can detect particularly, but not only, oscillations of the rotor, and consequently of the nacelle, of the wind turbine in the longitudinal direction of the rotor axis. Also coming into consideration are strain gages, which can detect oscillations on the basis of strains on the tower of the wind turbine and/or which can recognize oscillations of the rotor blades when attached correspondingly, if for example they are arranged at a region at the root of the rotor blades. A rotor position sensor (e.g., encoder or rotary encoder) may also be used for oscillation measurement, if a variation over time of the rotor position thus detected, which may also be referred to as the rotary position of the rotor, is evaluated.

Torque oscillations of the generator may either be derived from the control of the wind turbine, which often has knowledge of the current output power of the generator. Or else oscillations of the torque may be detected by the specific current sensor as an oscillation detector (e.g., vibration or oscillation sensor). This is also only another example of an oscillation detector. Optical sensors, which can record movements of elements, also come into consideration as another example.

According to one embodiment, it is proposed that a limiting filter is proposed for controlling the generator, in particular for controlling it by way of a setpoint torque value, in order to limit a control signal, in particular to be specific the setpoint torque value, to a predetermined limit amplitude in a specified frequency range.

Preferably, the limit amplitude is in this case specified as a frequency-dependent variation in amplitude. This is particularly based on the idea that relationships between the torque of the generator and the resultant mechanical loadings are already known. Such relationships may be detected in advance by measurements or by simulations. Here, the specified frequency range may also be defined and correspondingly specified, that is to say also the associated limit amplitude, which as a result may be predetermined. Then, the maintenance of the specifiable mechanical loading limit can be achieved by this limiting filter in an easy and in particular also quick way. Particularly, with this proposal there is no need for any feedback of measurements.

Particularly in the case of investigations in advance, whether on an actual system or by means of simulations, a frequency dependence can also be recognized and recorded in principle and also quantitatively. Accordingly, the limit amplitude may be different depending on the frequency. A frequency-dependent variation in amplitude may in this case also particularly relate to the use for example of a jump signal as a setpoint torque value. According to the teaching of Fourier, such a jump signal is made up of different frequency components and precisely that can be taken into account by specifying a frequency-dependent variation in amplitude. It possibly comes into consideration that such a limit amplitude is designed as a corresponding frequency-dependent function or a frequency-dependent limiting system. A corresponding frequency-dependent filter particularly comes into consideration here.

Preferably, the wind turbine has a synchronous generator, it being of a gearless configuration. It is also provided that the power unit has a rectifier and a stepup converter, or that it has a controlled rectifier. If it has a controlled rectifier, the stepup converter is not needed.

For this use of a synchronous generator, it is thus envisaged to use the stepup converter or the controlled rectifier for controlling the generator for controlling the power output by the generator or for controlling the generator torque. Both with the stepup converter and the controlled rectifier, in each case a stator current of the generator can be controlled. This stator current is to this extent an output current of the synchronous generator.

Consequently, the output power of the synchronous generator can be controlled by the control of this stator current. With corresponding conversion and account taken of the speed of the rotor of the generator, similarly a torque can be derived from the stator current or a torque of the generator can be set by way of the stator current. The generator torque can consequently be specified as desired, and consequently also a torque acting on the rotor.

In the case of a preferably used gearless wind turbine, the torque of the rotor can consequently be specified directly. Particularly if the rotor torque is a critical factor with regard to the specifiable mechanical loading limit, a corresponding loading can be directly influenced, and possibly set and limited, by way of this controlling of the synchronous generator. Even if other elements or further elements are relevant with regard to the specifiable mechanical loading limit, such as for example a bending and/or oscillation of the rotor blades, this can also be influenced well by way of controlling the electrical power or generator torque output by the generator using the power unit mentioned.

Preferably, the synchronous generator is designed as a separately excited synchronous generator and the power unit then comprises an exciter generator, in particular a DC chopper, in order thereby to control an exciter current of the synchronous generator. As a result, the excitation of the synchronous generator can be controlled, and consequently a control of the generator torque can be carried out well. This also allows the output electrical power of the generator to be controlled. Correspondingly, the power unit is thereby provided with a good, and in particular further possibility of setting the power and/or the generator torque, and consequently of influencing the mechanical loading.

A wind turbine that is designed for feeding electrical power into an electrical supply grid is proposed. It comprises
    a tower with a nacelle arranged rotatably on it,
    an aerodynamic rotor, which can be driven by wind,
    a generator, which is coupled to the aerodynamic rotor and is intended for generating electrical power from wind,
    a power unit for controlling the generator for controlling electrical power output by the generator and/or for controlling a generator torque and a feed-in unit for feeding the electrical power output by the generator or part thereof into the electrical supply grid, a control unit for controlling the wind turbine such that,
in normal operation, an electrical feed-in power is fed into the electrical supply grid in dependence on the wind, the control unit being prepared to control a changing of the electrical feed-in power in dependence on a grid state and/or a grid demand of the electrical supply grid, the changing of the electrical feed-in power being guided such that a specifiable mechanical, in particular momentary, loading limit of the wind turbine is maintained.

The wind turbine is consequently designed in the way that has already been explained above in connection with the method for controlling a wind turbine.

The control unit of the wind turbine may be designed particularly as a process computer and in this case particularly be coupled to the power unit and the feed-in unit. Preferably, the control unit to this extent controls both the power unit and the feed-in unit. However, it also at least partially comes into consideration that the feed-in unit is controlled indirectly by the power unit.

Such control may be designed such that, by controlling the electrical power output by the generator, or indirectly by controlling the generator torque, the power unit also controls a supply of power, and over time a supply of energy, to the feed-unit. Part of the control of the feed-in unit may then be configured such that the feed-in unit controls the feeding into the electrical supply grid dependent on the power or energy that it receives from the power unit or through the control of the power unit.

The control unit may also be connected to a detecting unit for detecting at least one grid state. Particularly, the voltage in the electrical supply grid, or a voltage representative of it at the output of the feed-in unit, may be detected here, and in addition the fed-in current and/or the fed-in power.

The detecting of the voltage of the electrical supply grid in this case comprises in addition to a voltage amplitude also a frequency of the electrical voltage. Furthermore, a phase position is detected, in particular a phase position of the electrical voltage with respect to the fed-in electrical current. A fed-in reactive power component can also be derived from it. A need for change of the power to be fed into the electrical supply grid can also be deduced from these values, particularly the detected grid frequency and/or a change of the grid frequency.

This need for change may then be evaluated in the control unit and, dependent on it, again the controlling of the generator may be controlled, to be specific by way of controlling the power unit. The control unit may receive information concerning the grid state and otherwise also from the feed-in unit if the latter detects the mentioned grid variables or grid states or some of them.

The control unit may also include the specifiable mechanical loading limit. This may also be specified in the control unit. To the extent to which it is specified dependent on a stipulation and/or dependent on input variables, such a specification may also be carried out in the control unit. In this case, the mechanical loading limit may also be calculated there or determined in some other way. For absolute values of the specifiable mechanical loading limit, it also comes into consideration that they are stored in advance in the control unit, in particular at the factory. It nevertheless also comes into consideration that they are occasionally renewed.

According to one embodiment, it is provided that the wind turbine, in particular the control unit, is prepared for carrying out a method for controlling a wind turbine according to at least one embodiment described above.

For this purpose, the control unit may be designed correspondingly. The mentioned connections between the control unit and the power unit and also the feed-in unit may also be included in such a design. A connection of a measuring unit for recording grid states, in particular electrical variables of the electrical supply grid, may also be included in this preparation of the control unit for carrying out the method mentioned.

By means of a mechanical model of the wind turbine, mechanical loads can be estimated, in particular estimated in advance. This mechanical model may also be designed and used in the way explained above in connection with embodiments of the method for controlling a wind turbine.

A wind farm with multiple wind turbines is also proposed. In this case it is provided that the wind turbines, at least some of them, are designed according to at least one embodiment described above of a wind turbine.

Here it particularly comes into consideration that the wind turbines feed into the electrical supply grid together at a grid connection point, and thereby change this electrical feed-in power that is fed in altogether in dependence on a grid state and/or a grid demand, a changing of the electrical feed-in power of each individual wind turbine in this case being controlled such that a specifiable mechanical loading limit of each individual wind turbine is maintained. In this way it can be achieved that the power fed in altogether at the grid connection point can be adjusted better in dependence on the grid state or the grid demand.

According to one embodiment, it is proposed that the wind farm is connected to the electrical supply grid at a grid connection point in order to feed an electrical farm power into the electrical supply grid. The electrical farm power is essentially the sum of all the electrical feed-in powers of the wind turbines of the wind farm at the respective moment.

Furthermore, a central farm control is provided for the wind farm, in order to coordinate the wind turbines such that the electrical farm power is fed into the electrical supply grid at the grid connection point, in particular while taking into account the respective specifiable loading limit of each wind turbine. Consequently, the central farm control coordinates the wind turbines in any event with regard to their electrical feed-in power.

For this, the central farm control may give an individual setpoint value for the electrical feed-in power to each wind turbine. The wind turbine then sets the corresponding electrical feed-in power and the sum of all of these electrical feed-in powers is then essentially the electrical farm power. If, however, a changing of the electrical feed-in power is required, or such changing is announced, each wind turbine may return a signal to the central farm control in order to indicate to the central farm control a limitation of the possible changing of the feed-in power.

Dependent on this, the central farm control can then correspondingly adapt how the electrical farm power is divided up among the wind turbines, in that for example a wind turbine that has not yet met a specifiable mechanical loading limit takes over part of the power that another wind turbine cannot deliver at the moment because of a mechanical loading limit.

It also comes into consideration that, whenever a desired changing of the electrical farm power is not achievable because of the specifiable mechanical loading limits of all the wind turbines, then a new electrical farm power that can be achieved is specified.

It comes into consideration in this respect that it is proposed according to one embodiment that the central farm control transmits to a grid operator that is operating the electrical supply grid information concerning to what extent the changing of the electrical farm power can be implemented. The electrical supply grid or its grid operator can then adapt to this situation.

BRIEF DESCRIPTION OF THE SEVERAL VIEWS OF THE DRAWINGS

The invention is now described in more detail below by way of example on the basis of exemplary embodiments with reference to the accompanying figures.

DETAILED DESCRIPTION

Figure 1:
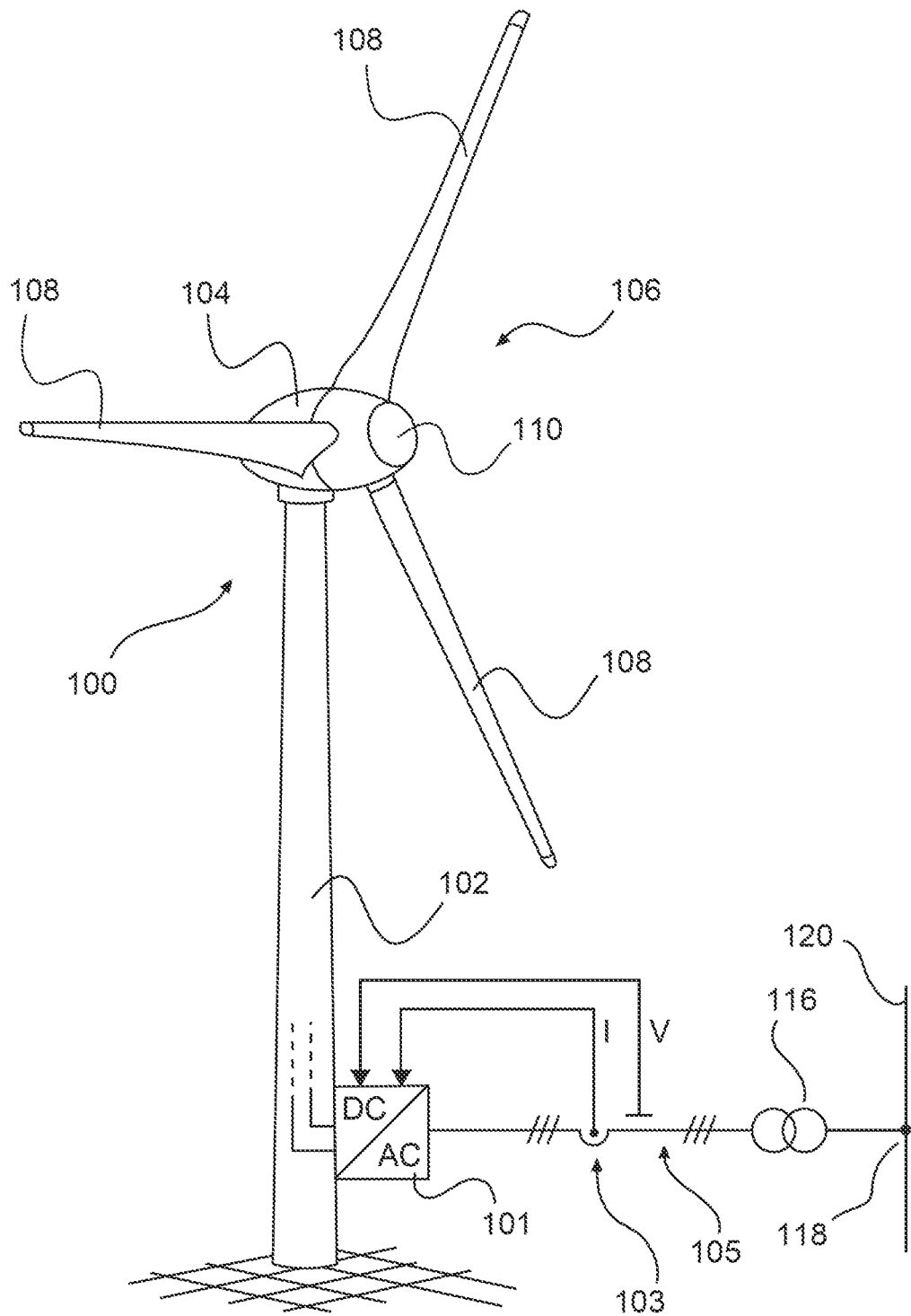
FIG. 1 shows a wind turbine in a perspective representation.

FIG. 1 shows a wind turbine 100 with a tower 102 and a nacelle 104. Arranged on the nacelle 104 is a rotor 106 with three rotor blades 108 and a spinner 110. During operation, the rotor 106 is set in a rotary motion by the wind, and thereby drives a generator in the nacelle 104.

Also provided is a feed-in unit (e.g., three-phase inverter) 101 for feeding electrical power output by the generator into an electrical supply grid 120. For this purpose, the feed-in unit outputs a three-phase alternating current, which can be fed into the electrical supply grid 120 by way of a grid transformer 116 at the common grid connection point 118.

Also indicated in FIG. 1 is a current detector (e.g., ammeter or multimeter) 103 and a voltage detector (e.g., voltmeter or multimeter) 105, which can also together form a measuring device. The current that can consequently be detected and the voltage that can consequently be detected can be used as an input signal for the feed-in unit 101. As a result, grid states such as the grid frequency or the grid voltage can also be detected. For detecting the grid voltage, the transmission behavior of the grid transformer 116 may be taken into account. It is also possible by the current detector 103 and the voltage detector 105 to detect the phase position of the current and voltage in relation to one another, and consequently also detect fed-in active power and fed-in reactive power, or thereby also a power factor. These variables form grid states. These values can consequently also be used when feeding in and also when taking into account specifiable mechanical loading limits.

Figure 2:
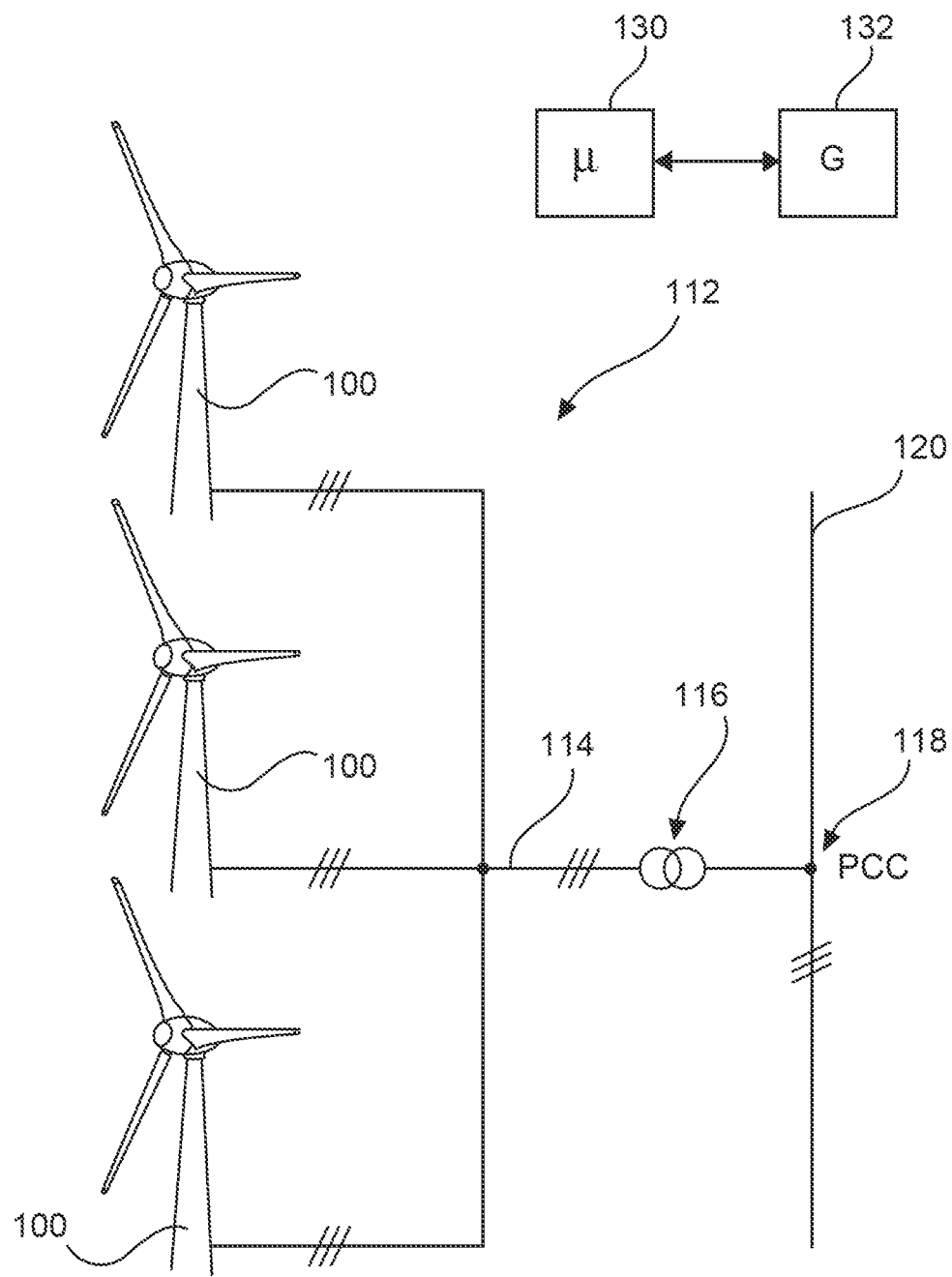
FIG. 2 shows a wind farm in a schematic representation.

FIG. 2 shows a wind farm 112 with, by way of example, three wind turbines 100, which may be the same or different. The three wind turbines 100 are consequently representative of, in principle, any desired number of wind turbines of a wind farm 112. The wind turbines 100 provide their power, to be specific in particular the current generated, by way of an electrical farm grid 114. In this case, the respectively generated currents or powers of the individual wind turbines 100 are added up and usually a transformer 116 is provided, which steps up the voltage in the farm in order to then feed it into the supply grid 120 at the feed-in point 118, which is also referred to generally as a PCC. The farm grid 114 may for example be differently designed, in that for example there is also a transformer at the output of each wind turbine 100, just to mention one other exemplary embodiment.

The wind farm 112 also has a central farm controller 130. With the central farm controller 130, the wind turbines 100 can be coordinated. For this purpose, there is a communication between the central farm controller 130 and the wind turbines 100. This communication may take place in a cable-bound or else wireless manner. For the sake of better overall clarity, no communication connections between the central farm controller 130 and the wind turbines 100 are shown.

Communication between the central farm controller 130 and a grid operator also comes into consideration. Such communication may take place with a grid control center (e.g., grid controller) 132 of the grid operator and this is indicated in FIG. 2. In addition, the grid operator may request a need for supporting power and the central farm controller may then report back to the grid operator to what extent and in what way the need can be covered. In this case, a restriction for maintaining a specifiable mechanical loading limit may already be taken into account. Consequently, with such a mechanical loading limit already taken into account, the grid operator may receive information as to the extent to which its need can be covered by the wind farm 112.

Figure 3:
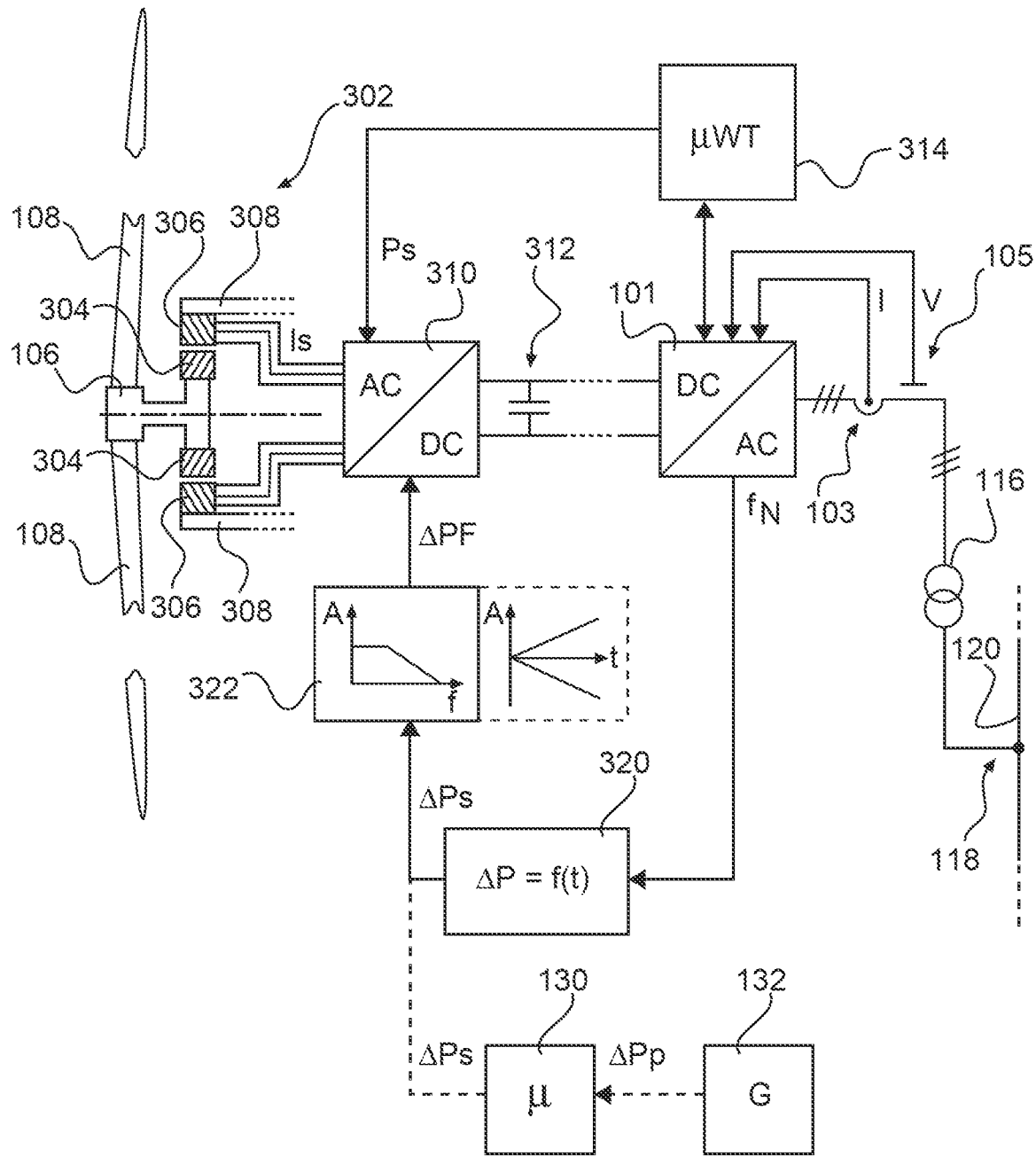
FIG. 3 shows a generator controlling in a schematic representation.

In FIG. 3, a controlling of a synchronous generator 302 is schematically represented. Of the synchronous generator 302, the rotor 304 and the stator 306 are designed in each case as annular regions. FIG. 3 shows this in an indicated sectional representation, so that they are shown as hatched regions. These hatched regions are essentially the magnetically effective regions of the rotor 304 and stator 306.

The rotor 304 is shown here as an inner-lying rotor, so that the synchronous generator 302 is in this example designed as an internal rotor, and as a ring generator. The rotor 304 is in this case fixedly connected to an indicated aerodynamic rotor 106. This aerodynamic rotor 106 consequently corresponds to the aerodynamic rotor 106 according to FIG. 1 and has correspondingly indicated rotor blades 108.

Merely for reasons of representation, only two rotor blades 108 are shown in FIG. 3. For the sake of simplicity, the same reference signs as in FIG. 1 have been chosen here to indicate that these may also be the same elements as in FIG. 1. The same applies to the further elements of FIG. 3, which have the same reference signs as in FIG. 1 and/or FIG. 2. Even though a different form of representation has been chosen in some cases, all of these elements coincide with the corresponding elements of FIG. 1 or 2 or both.

The synchronous generator 302 may consequently be arranged in the nacelle 104 of the wind turbine 100 according to FIG. 1. The stator 306 of the synchronous generator 302 is of a six-phase design, to be specific with two three-phase systems offset by 30 degrees in relation to one another. The stator 306 is fastened on a supporting frame 308, which is only indicated. By means of this supporting frame 308, the synchronous generator 302 is consequently fastened in a nacelle like the one in the nacelle 104 of FIG. 1, to be specific on a machine carrier.

The six-phase stator current $I_S$ is then passed to an active rectifier 310. The active rectifier 310 rectifies this six-phase stator current $I_S$ and generates a direct current with a direct voltage and passes this to the DC link 312. The active rectifier 310 may in this case also specifically control the stator current Is and thereby also control a torque of the synchronous generator 302. For this, the active rectifier 310 may receive a setpoint power value $P_S$ and optionally a setpoint reactive power value $Q_s$ that is not shown in FIG. 3.

The setpoint power values $P_S$ and possibly $Q_s$ may for example be specified by a control unit (e.g., controller) 314. Such a setpoint power value $P_S$, which is thus specified by the control unit 314, may be specified for example dependently on a speed of the aerodynamic rotor 106 in a way corresponding to a speed-power curve. The control unit 314 may correspondingly calculate this. Just for the sake of simplifying the representation, to this extent an input of a detected speed n into the control unit 314 is not shown. Otherwise, however, the schematically represented control unit 314 can in any case perform any controls of the wind turbine, or perform a large part of the control of the wind turbine, and in this case then have such a speed value available in any case.

Consequently, an operating point of the wind turbine is set by way of the setpoint power value $P_S$. In a special situation described further below, this power that has been set may be changed at least in the short term by a differential power $\Delta P_F$. To this extent, $\Delta P_F$ is shown in FIG. 3 as a further input variable for the active rectifier 310.

In any event, the power or energy that the active rectifier 310 has input into the DC link 312 is converted by the feed-in unit (e.g., inverter) 101 into a three-phase alternating current with a three-phase alternating voltage and is finally fed into the electrical supply grid 120 at the common grid connection 118.

The schematically shown feed-in unit 101 can use the measured currents and voltages, particularly as they have been recorded by the current detector 103 and the voltage detector 105, in order to detect grid states of the electrical supply grid 120. One possibility is to detect a grid frequency $f_N$ as a grid state.

It may thus be provided that, dependent on the detected grid frequency, a supporting power is to be fed into the electrical supply grid, to be specific in addition to the current power, particularly in addition to the specified power $P_S$ of the current operating point. It particularly comes into consideration here that, for short-term frequency drops of the grid frequency $f_N$, a supporting power is to be fed into the electrical supply grid quickly and also only for a short time. A short time may particularly lie in the range from 5 to 30 seconds. Such supporting power may lie in the range from 5 to 20 percent of the current output power of the synchronous generator 302, that is to say in the range from 5 to 20 percent of the power $P_S$.

As a result, such additional supporting power can be generated by the synchronous generator that the latter is electrically braked, whereby kinetic energy is converted into electrical power. For this purpose, the active rectifier 310 may correspondingly increase the stator current Is. An exciter current may possibly be set. As a result, the generator torque also increases, which leads to said electrical braking of the rotor and thereby an increase in the power generated. Particularly, the aerodynamic rotor 106 but also the rotor 304, which may also be referred to as an electrodynamic rotor, is thereby braked. Its kinetic energy is therefore converted.

It has thus been recognized that, although such supporting power can be helpful, it may also constitute great loading of a mechanical nature for the wind turbine. It is correspondingly proposed to guide the changing of the electrical power, to be specific the increasing of the electrical power output by the generator, by the differential power $\Delta P_f$ such that a specifiable mechanical loading limit of the wind turbine is maintained. One possible way of implementing this is explained in FIG. 3.

Accordingly, the feed-in unit 101 outputs the grid frequency $f_N$ and transfers it to the power changing block (e.g., controller or central farm controller) 320. The latter may have implemented a function which, dependent on the frequency f that is input here as the grid frequency $f_N$, determines a change in power. In simplified terms, it can be assumed that the power changing block 320 also knows the rated grid frequency, that is to say the frequency that the electrical supply grid should have, that is to say usually 50 Hz or 60 Hz, to be specific has implemented or stored it. In this case, the implemented function will usually take the form that, if the frequency corresponds to the rated frequency, the required change in power has the value 0.

In the example explained, it is however assumed that the grid frequency $f_N$ has fallen significantly below the rated frequency. Then, dependent on this, the power changing block 320 calculates a corresponding setpoint differential power value $\Delta P_S$. The output power of the synchronous generator 302 is to be increased by this setpoint power changing value $\Delta P_S$. This is based on the idea that power losses are negligible and, correspondingly, this increased power is also fed in, so that the electrical feed-in power is changed in the same way.

In order then however to maintain specifiable mechanical loading limits of the wind turbine, this setpoint value of the power change $\Delta P_S$ is not given directly to the active rectifier 310 as a setpoint value, but is first passed via a filter element (e.g., controller or central farm controller) 322.

There are various possible ways in which this filter element 322 can be configured. In FIG. 3, two of these possibilities are graphically indicated. Of them, the left variant is shown in a block depicted by solid lines and the right variant in a region depicted by dashed lines. It is intended to be indicated by this that these variants can be alternatives.

The variant indicated in the left part of the filter element 322 is configured as a lowpass filter. Low frequencies are therefore allowed through and higher frequencies are attenuated all the more the higher they are. In the case of the setpoint value of the change in power $\Delta P_S$, it comes into consideration that this setpoint value can be generated by the power changing block 320 with a very quickly changing grid frequency $f_N$ as a setpoint jump value or abruptly increasing setpoint value. In this case, the rising flank of such a jump value corresponds to a high-frequency signal or high-frequency component of a signal and the indicated lowpass filter would consequently attenuate such a steep flank correspondingly.

The variant shown on the right specifies a maximum gradient, to be specific for the amount of the change, so that a rising positive flank and falling negative flank respectively form the limits. The setpoint value entered in the filter block 322 is consequently limited to these flanks. Otherwise, there may of course be further variants than these two variants shown of the lowpass filter and of the limited gradients. A combination also comes into consideration.

The result of the filter element 322 is a filtered change in power $\Delta P_F$, which is then input into the active rectifier 310 as a setpoint value. Consequently, the active rectifier 310 does not receive such a strong signal in the form of a jump through the filter element 322, so that the synchronous generator 302 can also correspondingly not be controlled as hard any longer.

However, it also comes into consideration here that the filter element 322 is time-variant, or is controlled in a time-variant manner, in order to change the respective filter function. This applies to the variant of the lowpass filter just as much as to the variant of the limit gradients, that is to say to other variants.

With such a time dependence or time-dependent control, it can particularly be provided and realized that how often the wind turbine, particularly the synchronous generator 302, has already had to withstand strong loading due to a sudden demand for a quick increase in power is taken into account. To be specific, it has been recognized that a strong abrupt increase in the power, which is accompanied by a correspondingly strongly increasing generator torque, does not directly damage the wind turbine, but in the case of sustained loading can be critical and can damage the wind turbine.

Sustained loading is in particular such loading in which such increases in power are demanded at short intervals, such as for example minute intervals, or 5 to 10 second intervals. In this case, it then comes into consideration that the first such increase in power is still passed on unfiltered to the active rectifier 310, and consequently as a result to the synchronous generator 302. If, however, a further such demand for an abrupt increase in power comes in quick succession, then, or only after a predetermined number in a predetermined time period, the filter element 322 can have its effect in such a way that such a jump in power is no longer allowed through.

Here it has particularly been recognized that many such jumps in power in quick succession also pose the risk that the synchronous generator 302 or the rotor 106 is made to oscillate. That can be avoided by the filter element 322, with in turn a first abrupt change in power being able to be passed on unfiltered.

A further variant is represented by dashed lines in FIG. 3, accordingly to be specific a change in power is specified by a grid operator instead of by a measured grid state. This is indicated by the control center 132, which may correspond to the grid control center (e.g., grid controller) 132 of FIG. 2. This control center may for example demand a change in power $\Delta P_P$ of a farm power. The grid control center may therefore demand that the farm power fed in altogether from a wind farm, such as the wind farm 112 of FIG. 2, changes by this change in power of the farm power $\Delta P_P$.

Such a demand for a changed farm power may be passed to a central farm controller 130, such as that shown in FIG. 2. The central farm controller 130 may then convert this setpoint value of a farm power into a setpoint value of a changed installation power and output it. The central farm controller 130 therefore generates a setpoint value of a change in power $\Delta P_S$ and inputs it into the filter element 322. This is a substitute for specifying a setpoint value for a change in power $\Delta P_S$, which according to the first variant has been generated by the power changing block 320. Otherwise, the further processing of this setpoint power value can be carried out in the filter element 322 as explained above.

This proposes a solution which provides a changing of the feed-in power while taking into account mechanical loading. The changing of the feed-in power may arise from a grid state, including a grid oscillation, which can be detected. The grid state, which may in principle also comprise multiple elements and to this extent also stands synonymously for multiple grid states, can be detected particularly by the wind turbine or a farm controller, or be input by way of an external interface, for example by a grid operator, which in this way can demand a change in power. These three possibilities may also be referred to as 3 levels.

Particularly proposed is a solution for access to the rotational energy of the rotor of the wind turbine to improve the properties of the grid.

The solution consequently relates to the use of the rotational storage device particularly for local system services. This may include the provision of control power, flywheel replication, voltage impression or else a yield-optimized gradient restriction.

It has been recognized that an active rectifier makes very high efficiency gradients at the generator possible, and consequently allows corresponding torque gradients to be realized. In this respect, to restrict mechanical loading, a corresponding restriction is proposed. Consequently, a reduction or limitation of the loadings of the mechanical structure with grid-related power gradients is proposed.

Preferably, a dynamic restriction of the efficiency gradients in dependence on the loading of the mechanical structure is provided.

It has particularly been recognized that access to the rotational energy of the rotor may take place through an active rectifier, whereby high torque gradients at the rotor shaft become possible. As a result, high loadings of the mechanical structure are possible.

New system services allow the mechanical oscillation system of a wind turbine to become coupled with the oscillation systems in the grid. This is counteracted by the proposed solution.

Particularly the following is proposed:
Restricting the torque gradients or the variation in torque to avoid mechanical stress or exceeding of maximum loads.

Particularly, a gradient restriction is proposed, and/or a displacement of an excitation spectrum by making the variation in torque more uniform, for example by a lowpass filter, particularly according to a delay element of the first or second order (PT1/PT2).

One proposal is to specify definitions of the dead times that are to be maintained after sudden torque changes. One variant is to wait for the decay of a mechanical oscillation.

A further fundamental approach is the avoidance of mechanical oscillations. In this respect, it may be proposed to take into account the resonant frequencies in the mechanical system in the control of the generator torque.

The placing of the poles in the control that is used also comes into consideration, accordingly a distance of the poles in the complex plane from the imaginary axis is set or increased.

Most preferably, a mapping of the mechanical model in the control takes place.

One variant proposes a detection of the vibrations and reaction of the generator control, in order thus for the control system to respond to such oscillations.

An avoidance of any excitations by way of specifying a specific frequency range as a limit curve is also proposed. This may also depend on a predetermined amplitude, or the amplitude is specified as the limit curve.

Particularly arising as advantages of the proposed solutions are an avoidance/a reduction of mechanical stress at the same time as an improvement of the properties of the grid in comparison with solutions that do not take mechanical loadings into account.

A decoupling of the oscillation systems of the electrical supply grid on the one hand and the wind turbine on the other hand is also possible. This can be achieved by adapted generator control that takes these two oscillation systems into account.

It has particularly been recognized that, when there is a change in the generator torque, the mechanical structure may be particularly loaded in the following two ways.

In the case of the first type of loading, an absolute one-off loading occurs directly when there is the jump in torque. This can have effects on bending of the tower of the wind turbine, on bending of the rotor blades and on maximum loads and lifetime loads.

A second type of loading is produced by a cyclical torque variation. This can give rise to an excitation of a resonance in the mechanical system.

In this respect, resonant frequencies of the mechanical system should be noted. A first tower oscillation may lie in the range of 0.25 Hz. A second tower oscillation may lie in the range of 1-3 Hz.

A first blade frequency in the flapwise direction may lie in the range of 0.55 Hz, and a first blade frequency in the chordwise direction may lie in the range of 0.75-0.9 Hz.

For this purpose it is proposed to take into account frequencies in the electrical supply grid. In this respect it has been recognized that so-called inter-area oscillations, that is to say oscillations in power between portions of the grid, may lie in the range of 0.2-0.8 Hz.

So-called power system oscillations (PSO), that is to say local oscillations in power, may have frequencies from 1 Hz. Furthermore, so-called subsynchronous resonances (SSR), that is to say voltage oscillations with frequencies below the grid frequency, may particularly lie in the range of 15 Hz.

The invention claimed is:

1. A method for controlling a wind turbine for feeding electrical power into an electrical supply grid,
   wherein the wind turbine comprises:
   a tower having a nacelle arranged rotatably thereon;
   an aerodynamic rotor operable to be driven by wind;
   a generator coupled to the aerodynamic rotor and configured to generate the electrical power from the wind;
   an active rectifier configured to control the generator and one or more of: the electrical power output by the generator or a generator torque; and
   an inverter configured to feed the electrical power output by the generator or a portion of the electrical power output by the generator into the electrical supply grid, and
   wherein the method comprises:
   controlling the wind turbine, in normal operation, to feed an electrical feed-in power into the electrical supply grid depending on the wind; and
   changing the electrical feed-in power depending on one or more of a grid state or a grid demand of the electrical supply grid, wherein the changing of the electrical feed-in power is controlled such that a specifiable mechanical loading limit of the wind turbine is maintained,
   wherein the changing of the electrical feed-in power is controlled such that:
   following the generator torque exceeding a torque limit value having a predetermined amount, a further generator torque exceeding the torque limit value is suppressed for a predetermined recovery time period or is limited to the torque limit value, and/or
   in response to a decaying oscillation of the generator torque with a maximum amplitude that exceeds a predetermined amplitude limit value, a further generator torque pulse with at least half an amplitude of the predetermined amplitude limit value is avoided until at least one of:
      the decaying oscillation has decayed to an amplitude less than a predetermined amplitude decay value, or
      a predetermined decay has elapsed.

2. The method as claimed in claim 1, comprising:
setting at least one limit gradient for the changing of the electrical feed-in power, wherein the limit gradient represents a maximum amount or a maximum change over time of the electrical power generated by the generator, or the limit gradient represents a maximum amount or a maximum change over time of the generator torque to be controlled.

3. The method as claimed in claim 1, wherein:
the generator torque is controlled based on a setpoint torque value,
the setpoint torque value is output by a filter,
the setpoint torque value is set to reduce oscillation of the generator or avoid initiating the oscillation of the generator, and
the filter is a lowpass filter or a delay element.

4. The method as claimed in claim 1, wherein:
a generator control circuit includes the generator and the inverter,
eigenvalues and/or poles are specified for the generator control circuit, and
the eigenvalues and/or poles are specified such that the specifiable mechanical loading limit of the wind turbine is maintained.

5. The method as claimed in claim 4, wherein the generator control circuit includes mechanical elements or uses mechanical properties selected from a list including:
the aerodynamic rotor, a moment of inertia of the aerodynamic rotor or at least one blade eigenfrequency of the aerodynamic rotor, and
the tower and the nacelle or at least one eigenfrequency of an oscillation of the tower and the nacelle.

6. The method as claimed in claim 5, wherein the generator control circuit uses a property or a behavior of the electrical supply grid.

7. The method as claimed in claim 6, wherein the property of the electrical supply grid is an eigenfrequency or the behavior of the electrical supply grid is an oscillation of the electrical supply grid.

8. The method as claimed in claim 5, wherein the generator control circuit uses a mechanical model of the wind turbine for the changing of the electrical feed-in power to cause the specifiable mechanical loading limit of the wind turbine to be maintained.

9. The method as claimed in claim 1, wherein:
an oscillation detector is provided for detecting at least one oscillation of the wind turbine, wherein the at least one oscillation is a mechanical oscillation and/or an oscillation of the generator, and
the at least one oscillation is used for the changing of the electrical feed-in power such that the specifiable mechanical loading limit of the wind turbine is maintained.

10. The method as claimed in claim 1, wherein:
a filter controls the generator using a setpoint torque value, wherein the filter limits a control signal to a predetermined limit amplitude in a specified frequency range.

11. The method as claimed in claim 10, wherein the control signal is a setpoint torque value and the predetermined limit amplitude varies depending on a frequency.

12. The method as claimed in claim 1, wherein:
the generator is a synchronous generator, and
the wind turbine includes a rectifier and a stepup converter or the wind turbine includes a controlled rectifier, and
the stepup converter or the controlled rectifier are used for controlling the generator.

13. The method as claimed in claim 12, wherein the synchronous generator is a separately excited synchronous generator and the wind turbine includes an exciter generator for controlling an exciter current of the synchronous generator.

14. The method as claimed in claim 1, wherein the specifiable mechanical loading limit is a momentary mechanical loading limit.

15. The method as claimed in claim 3, wherein the filter is a linear delay element of a first order or a second order.

16. The method as claimed in claim 1, wherein the predetermined amplitude decay value is less than 25% of the predetermined amplitude limit value or the predetermined decay is between 5 and 30 seconds.

17. A wind turbine for feeding electrical power into an electrical supply grid, comprising:
a tower having a nacelle arranged rotatably thereon;
an aerodynamic rotor operable to be driven by wind;
a generator coupled to the aerodynamic rotor and configured to generate the electrical power from the wind;
an active rectifier configured to control the generator and one or more of: the electrical power output by the generator or a generator torque;
an inverter configured to feed the electrical power output by the generator or a portion of the electrical power output by the generator into the electrical supply grid; and
a controller configured to:
control the wind turbine, in normal operation, to feed an electrical feed-in power into the electrical supply grid depending on the wind; and
change the electrical feed-in power depending on one or more of a grid state or a grid demand of the electrical supply grid, wherein the changing of the electrical feed-in power is controlled such that a specifiable mechanical loading limit of the wind turbine is maintained,
wherein the changing of the electrical feed-in power is controlled such that:
following the generator torque exceeding a torque limit value having a predetermined amount, a further generator torque exceeding the torque limit value is suppressed for a predetermined recovery time period or is limited to the torque limit value, and/or
in response to a decaying oscillation of the generator torque with a maximum amplitude that exceeds a predetermined amplitude limit value, a further generator torque pulse with at least half an amplitude of the predetermined amplitude limit value is avoided until at least one of:
the decaying oscillation has decayed to an amplitude less than a predetermined amplitude decay value, or
a predetermined decay has elapsed.

18. A wind farm, comprising:
a plurality of wind turbines including the wind turbine as claimed in claim 17.

19. The wind farm as claimed in claim 18, wherein:
the wind farm is connected to the electrical supply grid at a grid connection point in order to feed an electrical farm power into the electrical supply grid, and
a central farm controller is configured to coordinate the plurality of wind turbines such that the electrical farm power is fed into the electrical supply grid at the grid connection point based on a plurality of respective mechanical loading limits of the plurality of wind turbines.

* * * * *